(12) United States Patent
Lu

(10) Patent No.: US 7,162,803 B2
(45) Date of Patent: Jan. 16, 2007

(54) FOLDABLE TOOL RETAINER CAPABLE OF UPDATING THE TOOL EASILY

(76) Inventor: Chen Dung Lu, 235 Chung - Ho Box 8-24, Taipei (TW)

( * ) Notice: Subject to any disclaimer, the term of this patent is extended or adjusted under 35 U.S.C. 154(b) by 326 days.

(21) Appl. No.: 10/851,956

(22) Filed: May 24, 2004

(65) Prior Publication Data

US 2005/0257377 A1    Nov. 24, 2005

(51) Int. Cl.
*B26B 1/02* (2006.01)
*B26B 1/10* (2006.01)

(52) U.S. Cl. .............. 30/156; 30/155; 30/329; 30/331

(58) Field of Classification Search .......... 30/155–158, 30/161, 329–333, 514, 517, 519
See application file for complete search history.

(56) References Cited

U.S. PATENT DOCUMENTS 5,331,741 A * 7/1994 Taylor, Jr. .................... 30/158
5,661,908 A * 9/1997 Chen ........................... 30/125

\* cited by examiner

*Primary Examiner*—Boyer D. Ashley
*Assistant Examiner*—Edward Landrum

(57) ABSTRACT

A foldable tool retainer capable of updating the tool easily comprises an upper casing sheet; an upper pad; a work tool; a lower pad; a resisting sheet; and a lower casing sheet. When updating the work tool, it is only necessary to press the upper button to drive a buckling end of the upper control sheet to separate from the edge of a rotary shaft of the resisting sheet so that the lower pad can rotate around the ratchet shaft of the lower casing sheet again and the rotary shaft moves out of the notch of the upper pad. Then other components are detached along a sequence of actions reversing to the assembly process.

1 Claim, 11 Drawing Sheets

FOLDABLE TOOL RETAINER CAPABLE OF UPDATING THE TOOL EASILY

FIELD OF THE INVENTION

The present invention relates to foldable tool retainer, and particular to a foldable tool retainer capable of updating the tool easily.

BACKGROUND OF THE INVENTION

In general, foldable tool retainer has a casing and a tool received in the casing. The tool may be a knife, a saw, etc. One end of the tool is pivotally installed to one end of the casing. A receiving portion is formed in the casing. When the foldable tool retainer is not used, the tool can be folded and then is received in the receiving portion so that the tool can be carried easily.

Conventionally, the tool in the tool retainer cannot be updated. If the tool is a saw, the tool retainer only has the function of a saw. If the tool is a knife, the tool retainer can be used only as a knife.

To improve above mentioned defect, in one improvement, a plurality of tools are received in the retainer. However, this will induce that the width of the retainer increases. Thereby, if one of the tools is destroyed, it can not be updated. This induces an inconvenience to users.

SUMMARY OF THE INVENTION

Accordingly, the primary object of the present invention is to provide a foldable tool retainer capable of updating the tool easily which comprises the following components.

An upper casing sheet has an upper receiving portion at an inner side of one end of the upper casing sheet; the upper receiving portion having a through hole at a center thereof. Another end of the upper casing sheet has a concave portion.

An upper pad is riveted to the inner side of the upper casing sheet. One end of the upper pad has a notch corresponding to the upper receiving portion of the upper casing sheet. One side of the notch is installed with an upper control sheet which can be received in the upper receiving portion. An end of the upper control sheet is a buckling end; a center of the upper receiving portion being installed with an upper button corresponding to the through hole of the upper receiving portion. Another end thereof is installed with a sliding groove corresponding to the concave portion of the upper casing sheet. An inner side of the sliding groove is formed with an enlarged portion.

A work tool is pivotally installed to the sliding groove at the inner side of the upper pad. The work tool has a buckling groove at a position corresponding to the sliding groove.

A lower pad is installed at an inner side of the work tool. The lower pad is formed with a sliding groove corresponding to the upper receiving portion of the upper casing sheet. An inner end of the sliding groove is formed with an enlarged end. One end of the lower pad corresponding to the concave portion of the upper casing sheet has a hollow portion. An inner side of the hollow portion is connected to a lower control sheet with ratchet teeth. The lower control sheet has a lower button near the ratchet teeth.

A resisting sheet is fixed to one side of the lower pad by a rotary shaft and a retaining stud. One end of the resisting sheet corresponding to the sliding groove of the lower pad has a through hole for receiving the rotary shaft and another end thereof has a retaining hole for receiving a retaining stud.

A lower casing sheet is riveted to an outer side of the lower pad. One end of the lower casing sheet has a lower receiving portion for receiving the lower control sheet of the lower pad. One end of the lower receiving portion corresponding to the buckling groove of the work tool is installed with a ratchet wheel receiving portion. A ratchet shaft is rotatably installed in the ratchet wheel receiving portion and is buckled to the work tool. A ratchet wheel is engaged to the ratchet shaft. A periphery of the ratchet wheel has a plurality of ratchet teeth. A buckling block capable of buckling the buckling groove of the work tool is installed on the ratchet wheel. A center of the ratchet wheel receiving portion has a riveting hole capable of riveting the ratchet shaft. A through hole is formed nearby the ratchet wheel receiving portion for receiving the button. A lateral side of the lower receiving portion has a retaining hole for riveting the retaining stud.

The various objects and advantages of the present invention will be more readily understood from the following detailed description when read in conjunction with the appended drawing.

DETAILED DESCRIPTION OF THE INVENTION

In order that those skilled in the art can further understand the present invention, a description will be described in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
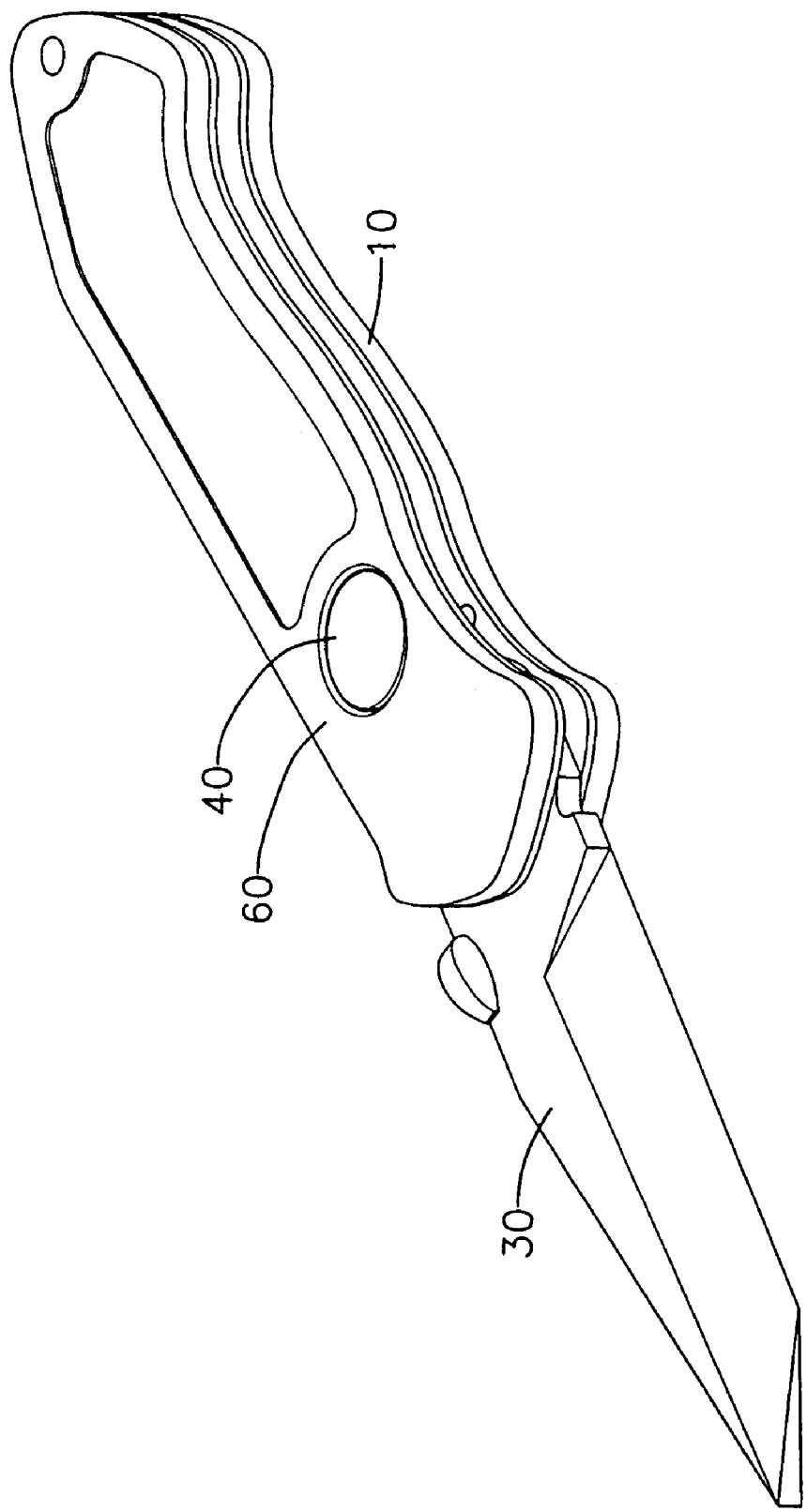
FIG. 1 is a perspective view of the present invention.
Figure 2:
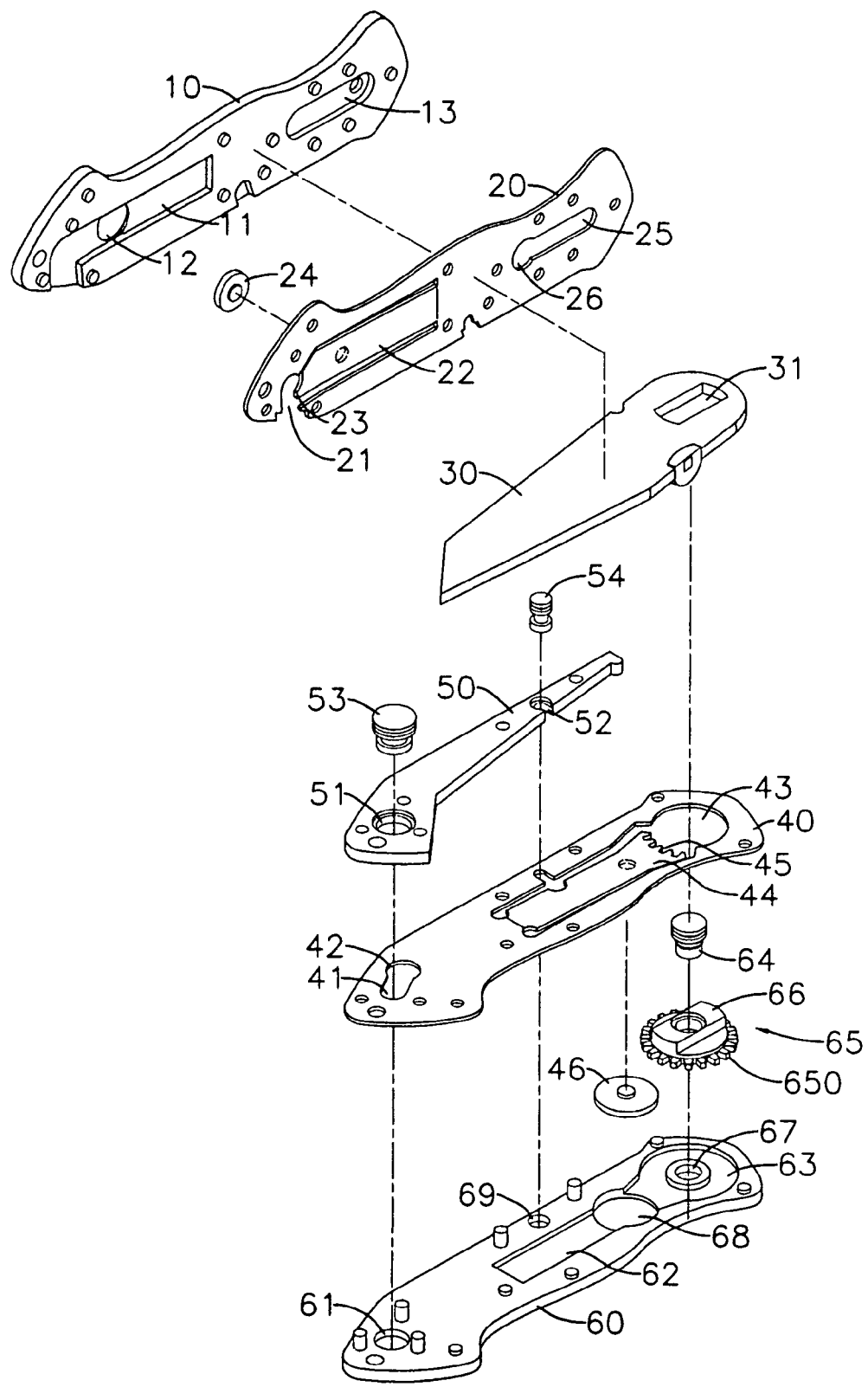
FIG. 2 is an exploded perspective view of the present invention.
Figure 3:
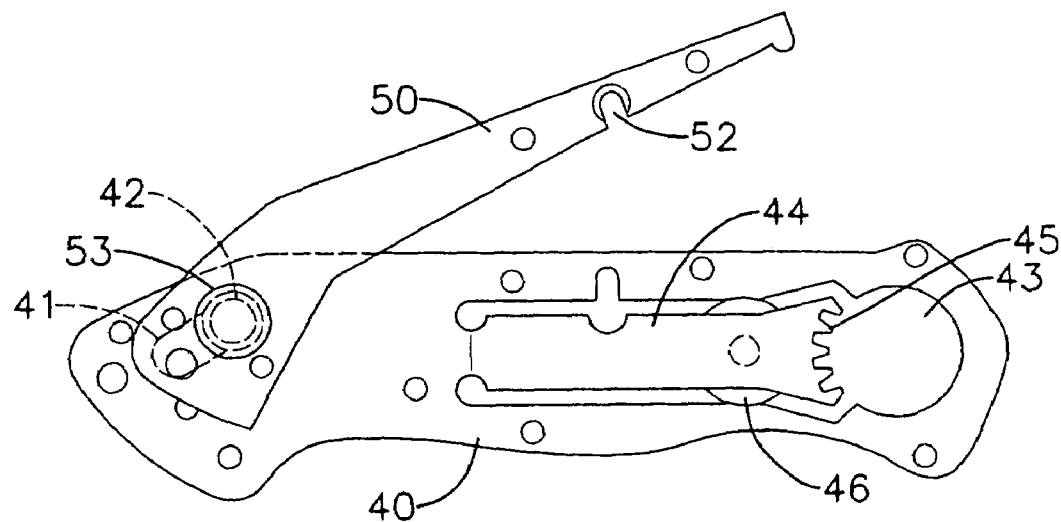
FIG. 3 is a plane schematic view showing one lower pad and one end of the resisting sheet before buckling.
Figure 4:
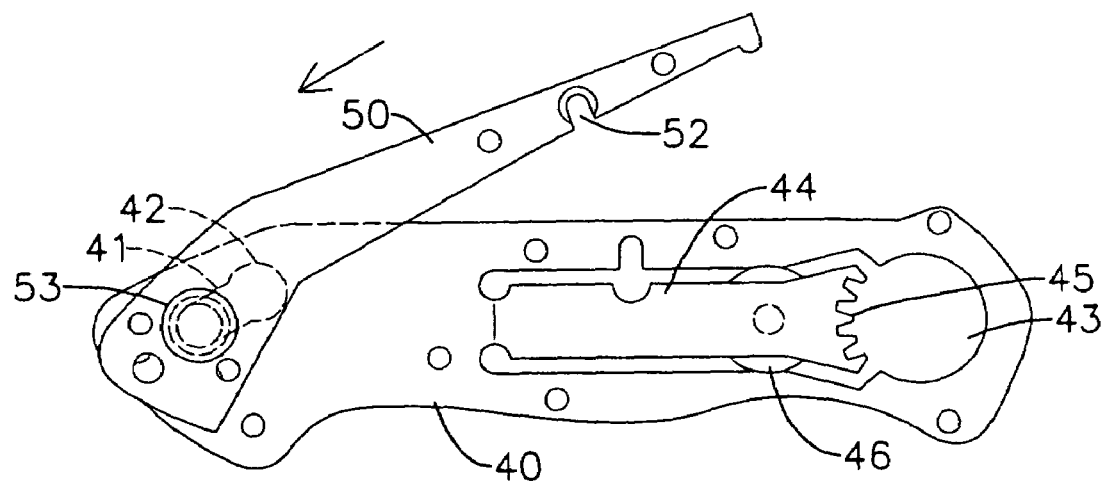
FIG. 4 is a plane schematic view showing one lower pad and one end of the resisting sheet after buckling.
Figure 5:
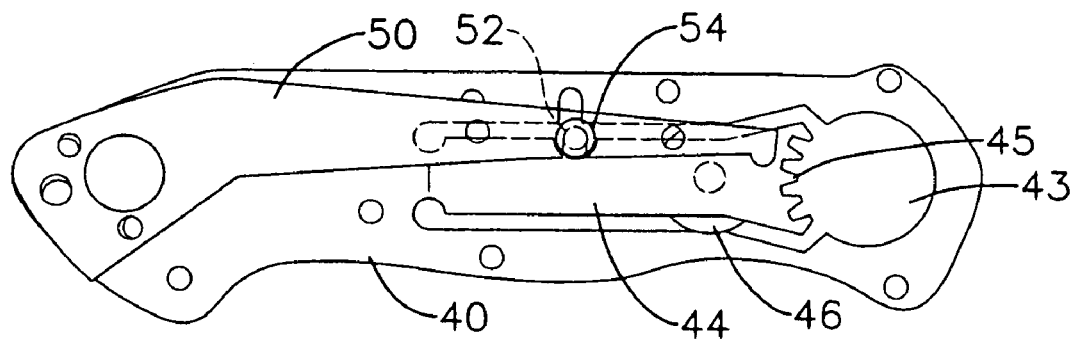
FIG. 5 is a plane schematic view showing another lower pad and one end of the resisting sheet before buckling.
Figure 6:
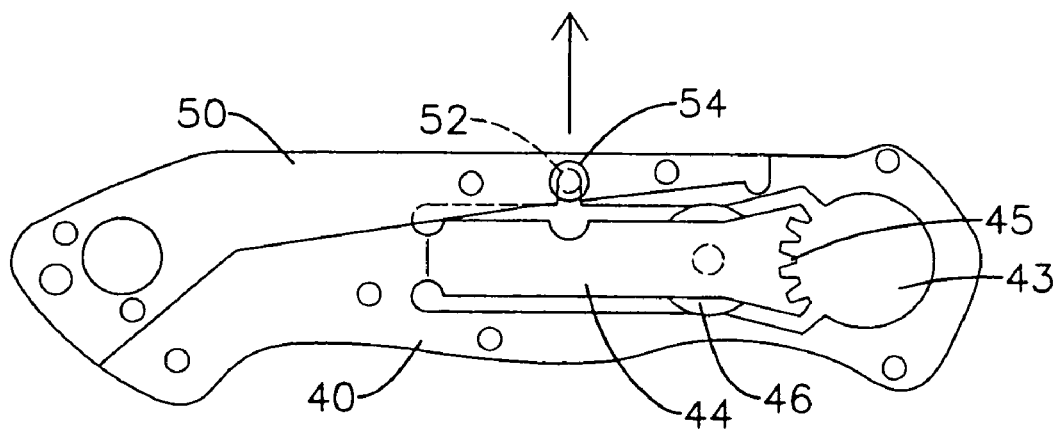
FIG. 6 is a plane schematic view showing another lower pad and one end of the resisting sheet after buckling.
Figure 7:
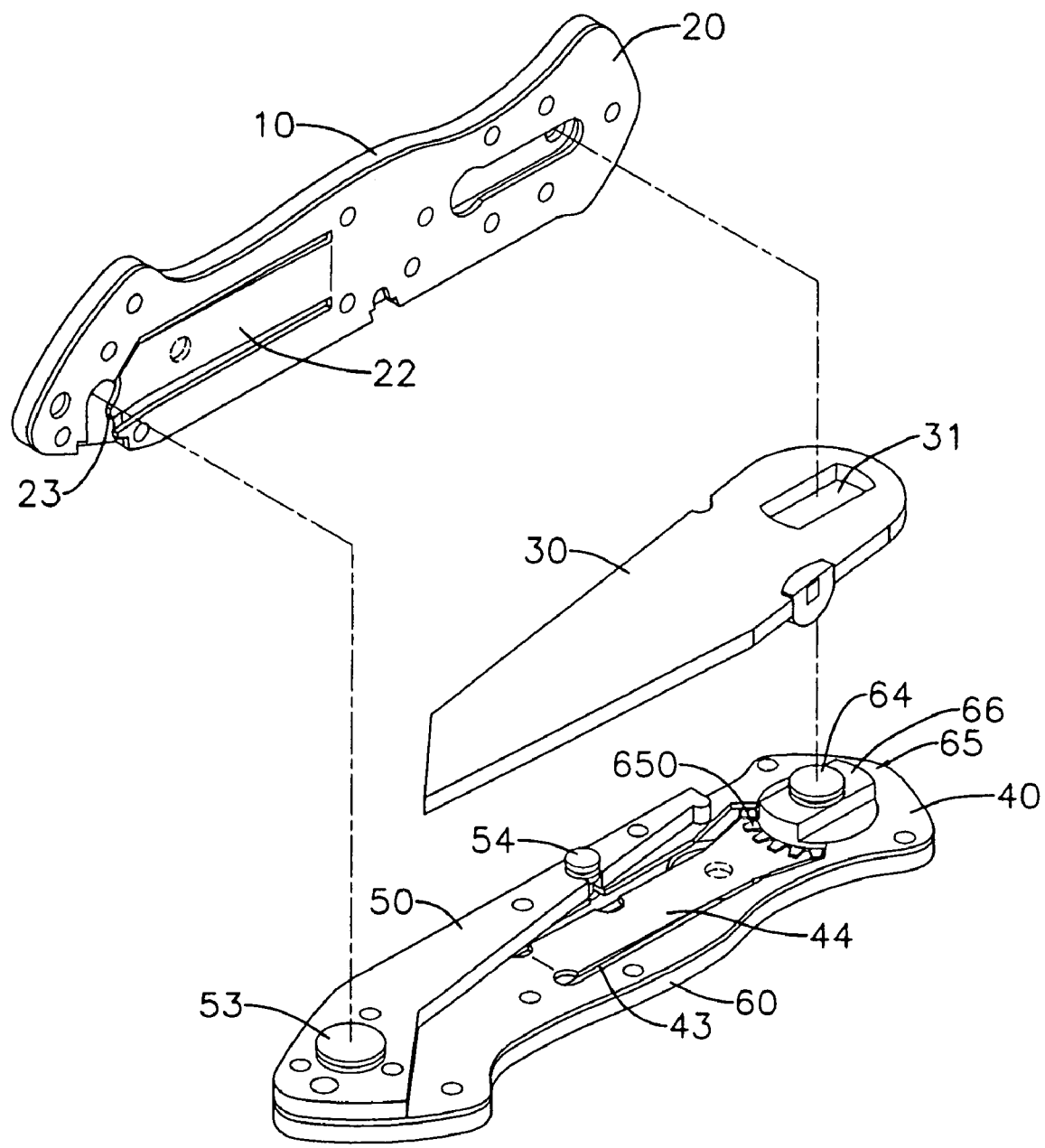
FIG. 7 is an exploded perspective view of the upper casing sheet, upper pad, work tool, lower pad, and lower casing sheet of the present invention.
Figure 8:
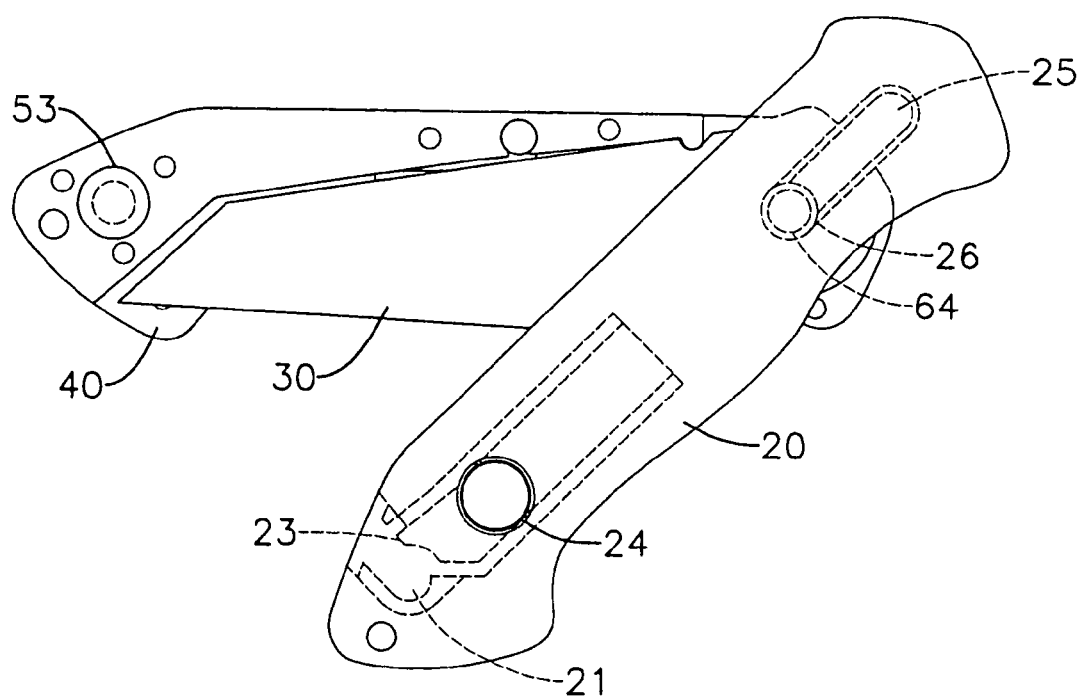
FIGS. 8 to 11 are schematic view showing the assembly of the present invention.
Figure 9:
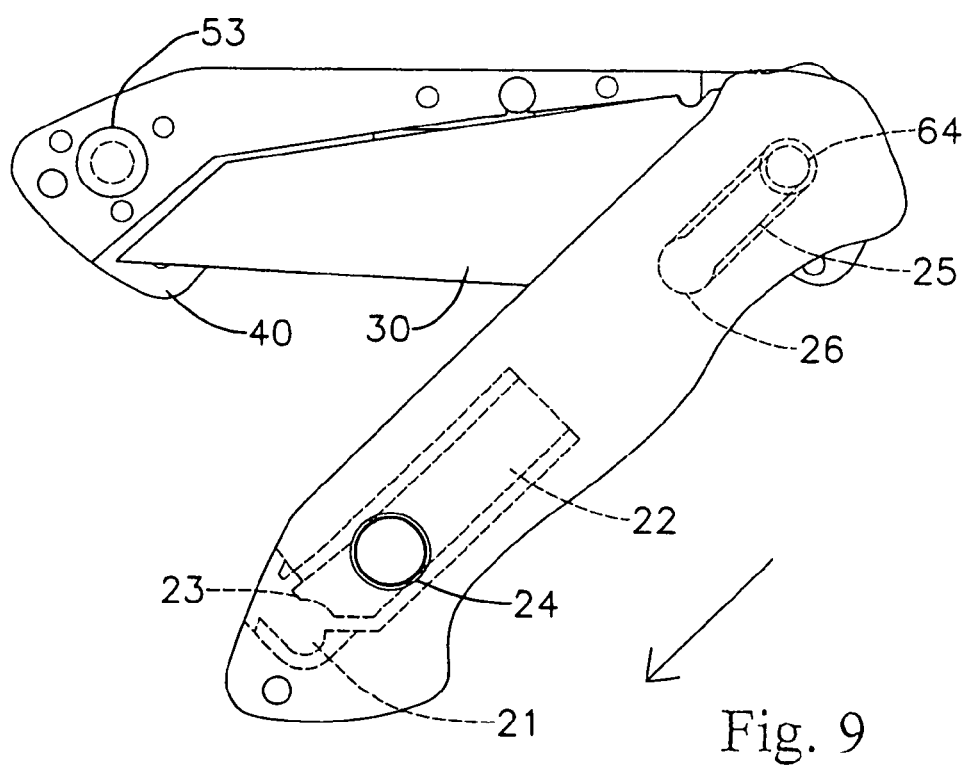
Figure 10:
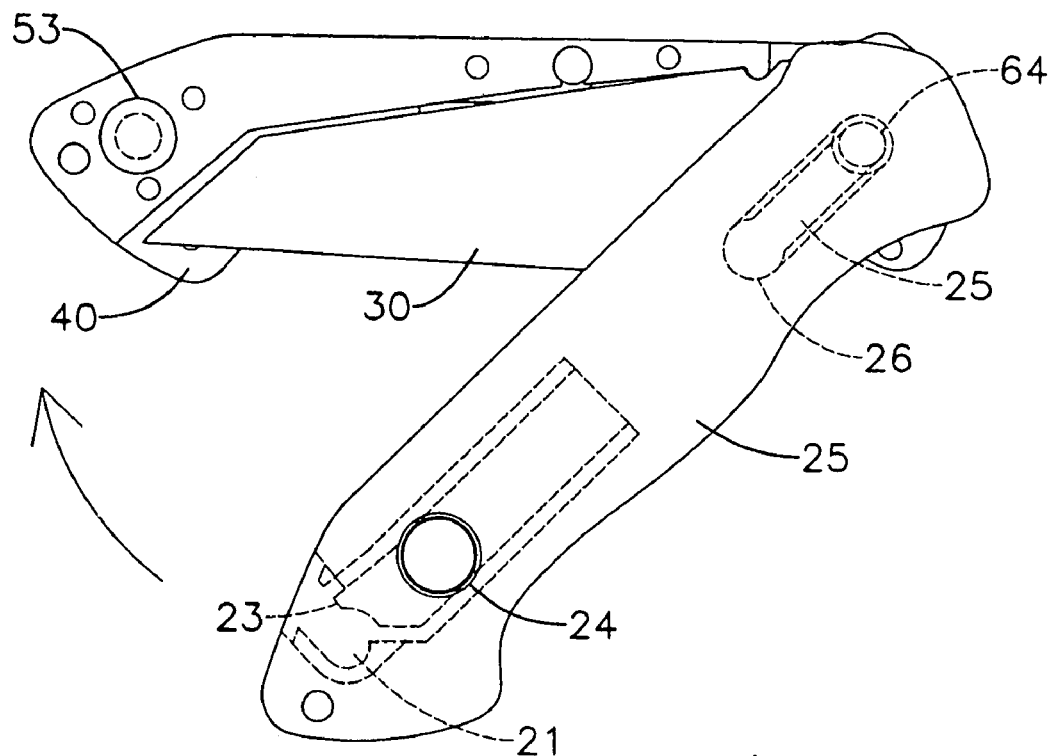
Figure 11:
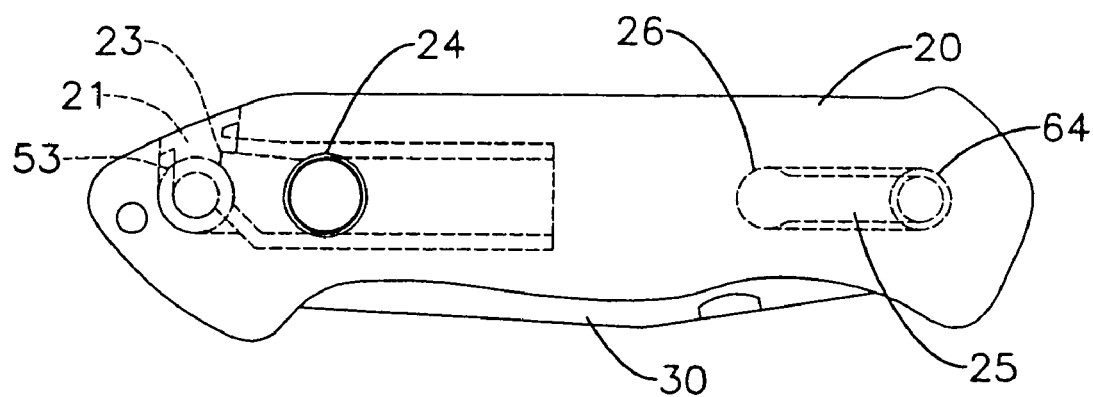
Figure 12:
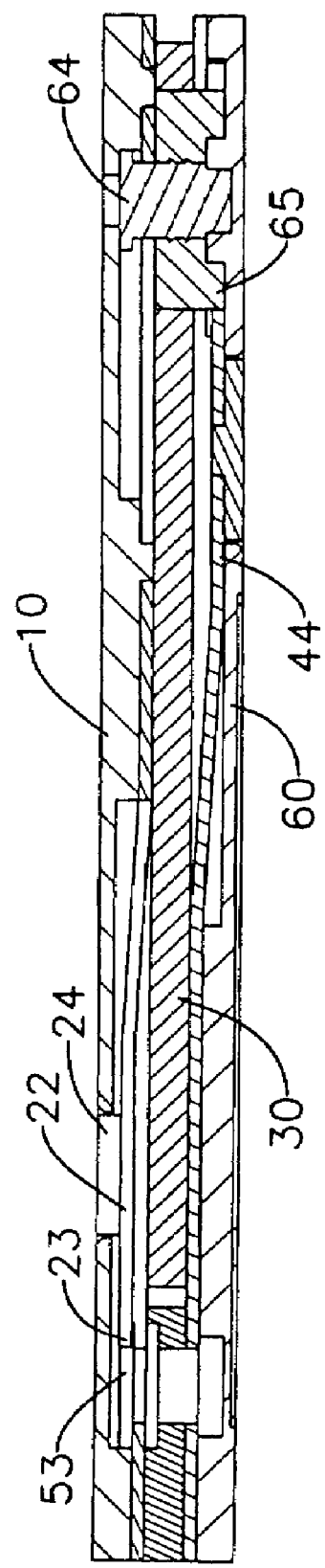
FIG. 12 is a cross section view showing the buckling of the present invention.

With reference to FIGS. 1 and 2, the present invention has the following components.

An upper casing sheet 10 has an upper receiving portion 11 at an inner side of one end of the upper casing sheet 10. The upper receiving portion 11 has a through hole 12 at a center thereof. Another end of the upper casing sheet 10 has a concave portion 13.

An upper pad 20 is riveted to the inner side of the upper casing sheet 10. One end of the upper pad 20 has a notch 21 corresponding to the upper receiving portion 11 of the upper casing sheet 10. One side of the notch 21 is installed with an upper control sheet 22 which can be received in the upper receiving portion 11. An end of the upper control sheet 22 is a buckling end 23. A center of the upper receiving portion 11 is installed with a button 24 corresponding to the through hole 12 of the upper receiving portion 11. Another end thereof is installed with a sliding groove 25 corresponding to the concave portion 13 of the upper casing sheet 10. An inner side of the sliding groove 25 is formed with an enlarged portion 26.

A work tool 30 is pivotally installed to the sliding groove 25 at the inner side of the upper pad 20. The work tool 30 has a buckling groove 31 at a position corresponding to the sliding groove 25.

A lower pad 40 is installed at an inner side of the work tool 30. The lower pad 40 is formed with a sliding groove 41 corresponding to the upper receiving portion 11 of the upper casing sheet 10. An inner end of the sliding groove 41 is formed with an enlarged end 42. One end of the lower pad 40 corresponding to the concave portion 13 of the upper casing sheet 10 has a hollow portion 43. An inner side of the hollow portion 43 is connected to a lower control sheet 44 with ratchet teeth 45. The lower control sheet 44 has a lower button 46 near the ratchet teeth 45.

A resisting sheet 50 is fixed to one side of the lower pad 40 by a rotary shaft 53 and a retaining stud 54. One end of the resisting sheet 50 corresponding to the sliding groove 41 of the lower pad 40 has a through hole 51 for receiving the rotary shaft 53 and another end thereof has a retaining hole 52 for receiving a retaining stud 54.

A lower casing sheet 60 is riveted to an outer side of the lower pad 40. One end of the lower casing sheet 60 has a lower receiving portion 62 for receiving the lower control sheet 44 of the lower pad 40. One end of the lower receiving portion 62 corresponding to the buckling groove 31 of the work tool 30 is installed with a ratchet wheel receiving portion 63. A ratchet shaft 64 is rotatably installed in the ratchet wheel receiving portion 63 and is buckled to the work tool 30. A ratchet wheel 65 is engaged to the ratchet shaft 64. A periphery of the ratchet wheel 65 has a plurality of ratchet teeth 650. A buckling block 66 capable of buckling the buckling groove 31 of the work tool 30 is installed on the ratchet wheel 65. A center of the ratchet wheel receiving portion 63 has a riveting hole 67 capable of riveting the ratchet shaft 64. A through hole 68 is formed nearby the ratchet wheel receiving portion 63 for receiving the button 46. A lateral side of the lower receiving portion 62 has a retaining hole 69 for riveting the retaining stud 54.

The assembly of the present invention will be described herein, wherein the riveting assembly will not be described since it can be understood easily by those skilled in the art. Furthermore, the rotary shaft, retaining stud, and ratchet shaft of the present invention are formed with annular recesses. However, since this is well known in the art, the details will not described here. Thereby, the structure about this is neglected.

Referring to FIGS. 3 to 6, the assembly of the lower pad 40 and the resisting sheet 50 is described here. At first, the rotary shaft 53 is positioned in the through hole 51 of the resisting sheet 50. Then one end of the rotary shaft 53 is inserted into the enlarged end 42 of the sliding groove 41 of the lower pad 40 so that the resisting sheet 50 rotates around the rotary shaft 53. Thus, the retaining hole 52 of the resisting sheet 50 is positioned in the hollow portion 43 of the lower pad 40. The retaining stud 54 installed in the retaining hole 52 is combined to the lower pad 40 and the resisting sheet 50.

Referring to FIGS. 7 to 12, In assembly of the upper casing sheet 10, upper pad 20, work tool 30, lower pad 40, and lower casing sheet 60, the buckling groove 31 of the work tool 30 is buckled to the buckling block 66 of the ratchet wheel 65. Then one end of the ratchet shaft 64 is inserted into the enlarged portion 26 of the sliding groove 25 of the upper pad 20 (the description of the riveting of the upper pad 20 to the upper casing sheet 10 is neglected since it is not the feature of the present invention and known in those skilled in the art). Movement of the upper pad 20 causes that the ratchet shaft 64 is embedded into the sliding groove 25 of the upper pad 20 from the enlarged portion 26. The upper pad 20 rotates around the ratchet shaft 64 so that the rotary shaft 53 slides into the notch 21 of the upper pad 20 and causes that the buckling end 23 of the upper control sheet 22 resists against the edge of the rotary shaft 53. Thus the assembly of the present invention is completed.

Figure 13:
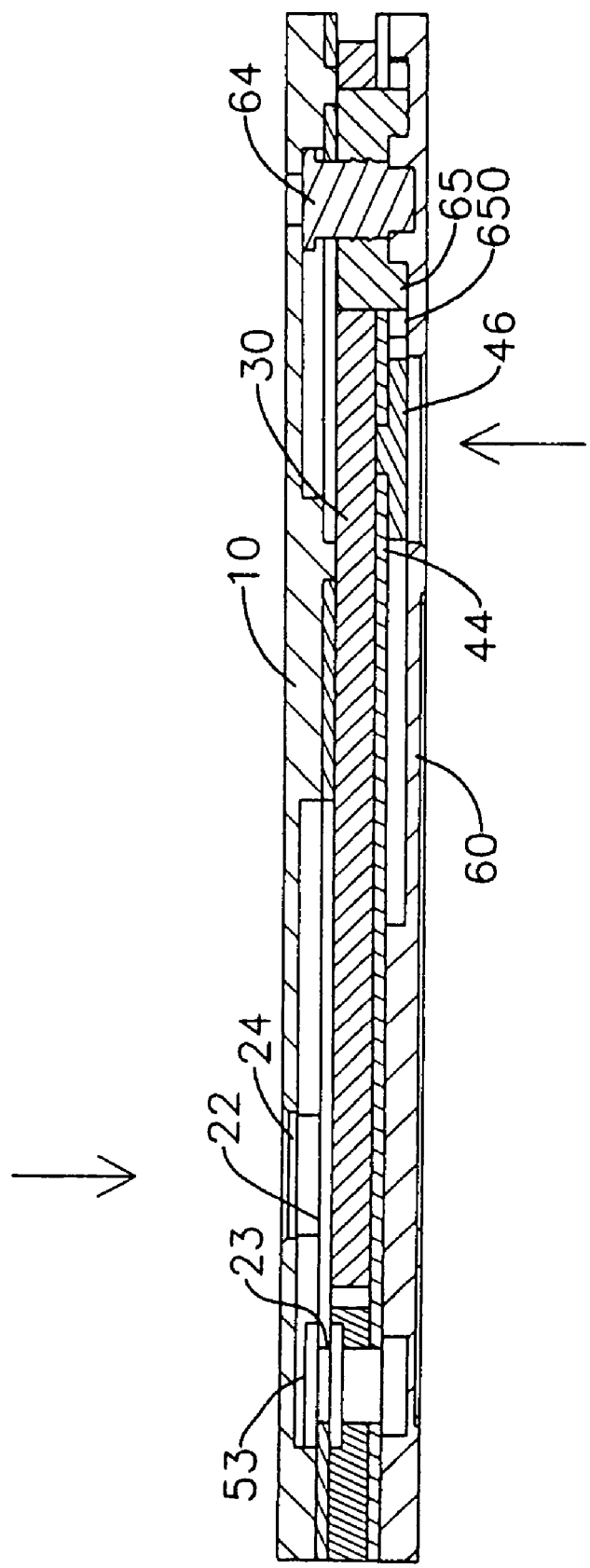
FIG. 13 is a cross section view showing the releasing of buckling of the present invention.
Figure 14:
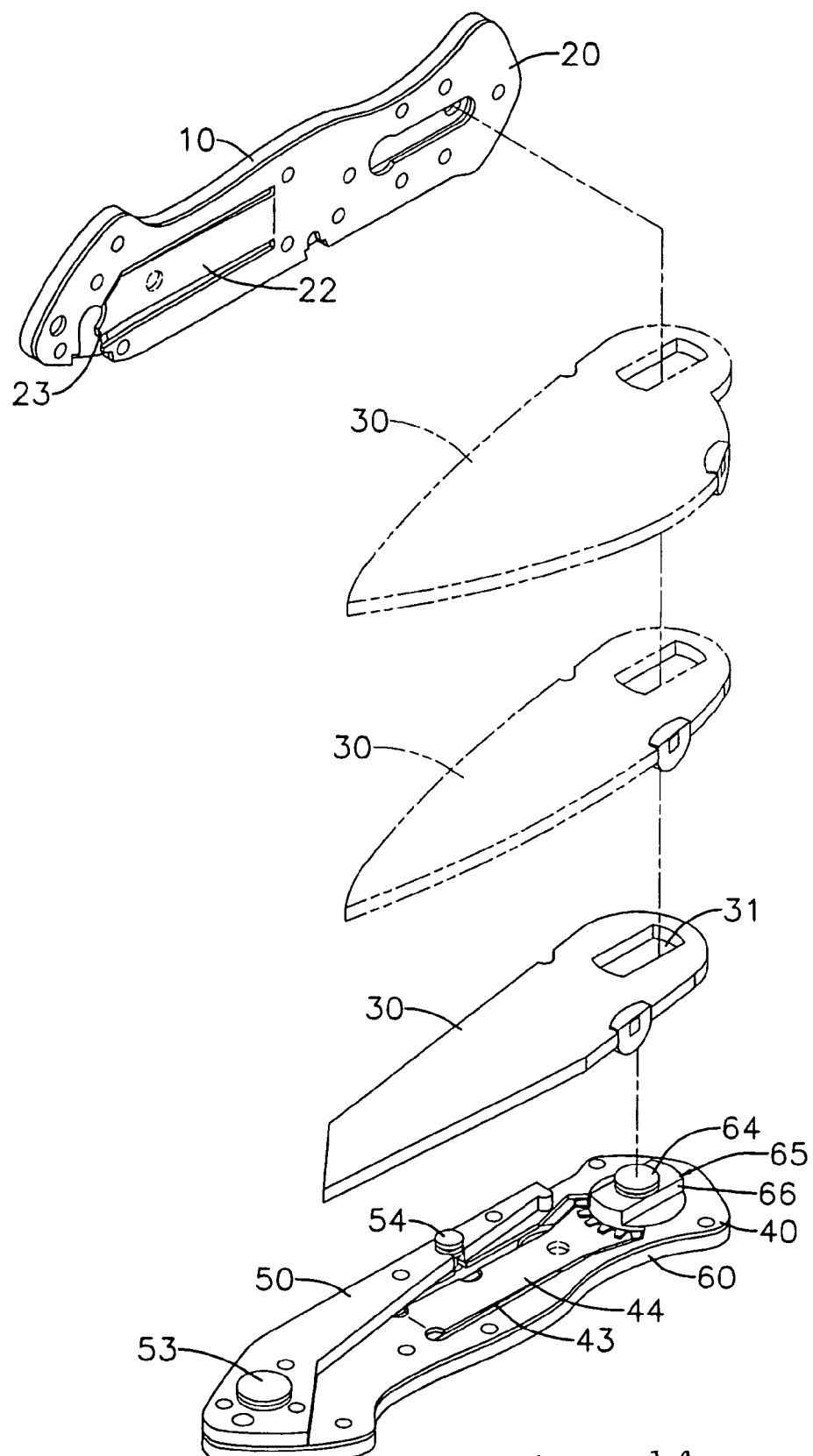
FIG. 14 is an exploded perspective view showing that the present invention is used with other work tool.

Referring to FIGS. 13 to 14, when updating the work tool 30, it is only necessary to press the upper button 24 to drive the buckling end 23 of the upper control sheet 22 to separate from the edge of the rotary shaft 53 so that the lower pad 40 can rotate around the ratchet shaft 64 again and the rotary shaft 53 moves out of the notch 21 of the upper pad 20. Then other components are detached along a sequence of actions reversing to the assembly process. Thus work tool 30 of different functions can be updated.

Figure 15:
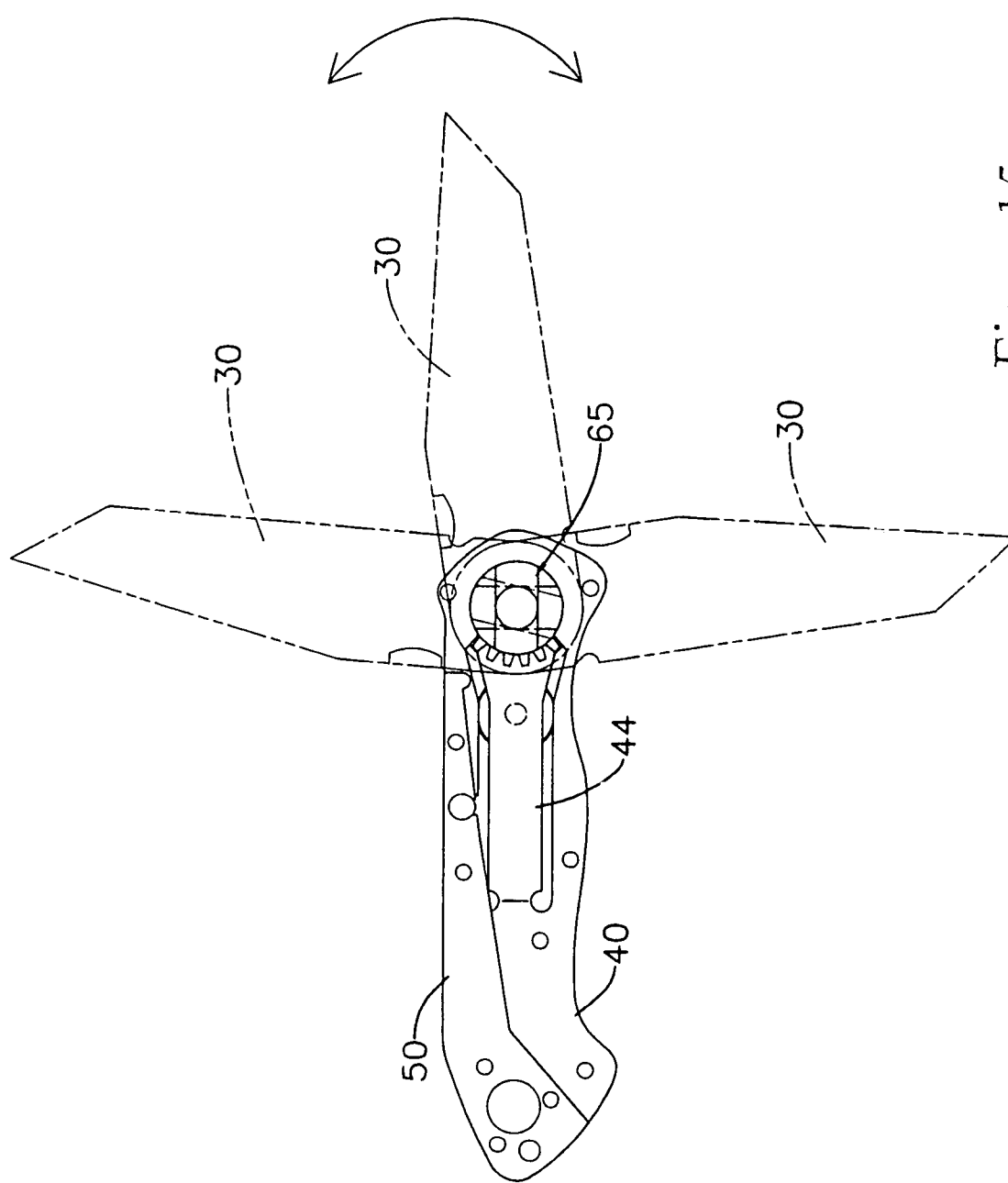
FIG. 15 is a schematic view showing the use of the present invention.

With reference to FIGS. 13 to 15, after assembling the components of the present invention, in any condition, the ratchet teeth 650 of the ratchet wheel 65 is engaged to the ratchet teeth 45 of the lower control sheet 44. Only when the lower button 46 is pressed, the ratchet teeth 45 of the lower control sheet 44 will separate from the ratchet teeth 650 of the ratchet wheel 65 so that the work tool 30 can drive the ratchet teeth 650 to rotate to a predetermined position. Then the lower button 46 is released so that the ratchet teeth 45 of the lower control sheet 44 is engaged to the ratchet teeth 650 of the ratchet wheel 65. Thus the work tool 30 can be used without vibration.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A foldable tool retainer capable of updating a tool easily comprising:

an upper casing sheet having an upper receiving portion at an inner side of one end of the upper casing sheet; the upper receiving portion having a through hole at a center thereof; another end of the upper casing sheet having a concave portion;

an upper pad riveted to the inner side of the upper casing sheet; one end of the upper pad having a notch corresponding to the upper receiving portion of the upper casing sheet; one side of the notch being installed with an upper control sheet which is received in the upper receiving portion; an end of the upper control sheet being a buckling end; a center of the upper receiving portion being installed with an upper button corresponding to the through hole of the upper receiving portion; another end thereof being installed with a sliding groove corresponding to the concave portion of the upper casing sheet; an inner side of the sliding groove being formed with an enlarged portion;

a work tool pivotally installed to the sliding groove at the inner side of the upper pad; the work tool having a buckling groove at a position corresponding to the sliding groove;

a lower pad being installed at an inner side of the work tool; the lower pad being formed with a sliding groove corresponding to the upper receiving portion of the upper casing sheet; an inner end of the sliding groove being formed with an enlarged end; one end of the lower pad corresponding to the concave portion of the upper casing sheet having a hollow portion; an inner side of the hollow portion being connected to a lower control sheet with ratchet teeth; the lower control sheet having a lower button near the ratchet teeth;

a resisting sheet fixed to one side of the lower pad by a rotary shaft and a retaining stud; one end of the resisting sheet corresponding to the sliding groove of the lower pad having a through hole for receiving the rotary shaft and another end thereof having a retaining hole for receiving a retaining stud;

a lower casing sheet riveted to an outer side of the lower pad; one end of the lower casing sheet having a lower receiving portion for receiving the lower control sheet of the lower pad; one end of the lower receiving portion corresponding to the buckling groove of the work tool being installed with a ratchet wheel receiving portion; a ratchet shaft being rotatably installed in the ratchet wheel receiving portion and being buckled to the work tool; a ratchet wheel being engaged to the ratchet shaft; a periphery of the ratchet wheel having a plurality of ratchet teeth; a buckling block capable of buckling the buckling groove of the work tool being installed on the ratchet wheel; a center of the ratchet wheel receiving portion having a riveting hole capable of riveting the ratchet shaft; a through hole being formed near the ratchet wheel receiving portion for receiving a button; a lateral side of the lower receiving portion having a retaining hole for riveting the retaining stud.

* * * * *